United States Patent [19]

Sullivan et al.

[11] 3,859,446

[45] Jan. 7, 1975

[54] METHOD FOR RAPID CURING OF CHEESE

[75] Inventors: Royal A. Sullivan, Binghamton, N.Y.; Dolores Infantino, Skokie, Ill.

[73] Assignee: Kraftco Corporation, Glenview, Ill.

[22] Filed: Sept. 26, 1973

[21] Appl. No.: 400,888

[52] U.S. Cl................... 426/36, 426/188, 426/361
[51] Int. Cl............................................. A23c 19/12
[58] Field of Search ............ 426/36, 150, 188, 361, 426/65, 175

[56] References Cited
UNITED STATES PATENTS 3,446,627  5/1969  Noznick et al........................ 426/36
3,650,768  3/1972  Roberts............................ 426/36 X

*Primary Examiner*—Raymond N. Jones
*Assistant Examiner*—R. A. Yoncoskie
*Attorney, Agent, or Firm*—Fitch, Even, Tabin & Luedeka

[57] ABSTRACT

Ripening of cheese is effected more rapidly during the curing period by adding an effective amount of adenosine 3',5', cyclic monophosphate to the cheese curd. The adenosine 3',5', cyclic monophosphate is added to the curd after separating the curd from the whey and prior to packing the curd into cheese hoops.

4 Claims, No Drawings

METHOD FOR RAPID CURING OF CHEESE

The present invention relates generally to an improved method for making cheese and more particularly relates to a method for rapidly developing flavor in ripened cheeses, such as American cheese and Swiss cheese, during the curing period.

American cheese, as used herein, is a term which identifies a group of cheeses which include Cheddar cheese, Colby cheese, Monterey and Jack cheeses. Cheddar cheese derives its name from a step in the manufacturing process wherein the drained cheese curd is cheddared or matted. While the present invention is sometimes described with particular reference to Cheddar cheese, it should be understood that the application is applicable to cheese having similar curd characteristics, texture and flavor, such as granular or stirred-curd cheese and washed or soaked-curd cheese.

In accordance with known methods for making American cheese and similar types of cheese, milk is adjusted to a temperature of from 86° to 88°F and is run into a cheese vat. A starter of Streptococcus lactis is added and the milk is stirred, usually for about an hour as the milk ripens by developing acidity through bacterial action. The amount of starter is adjusted so that acid develops at a desired rate during the make procedure and the time in the vat is controlled accordingly. Rennet and color, if desired, are mixed thoroughly into the ripened milk and stirring is stopped. The milk is permitted to set so as to form a coagulum of curd. When the curd is sufficiently firm, it is cut with curd knives into cubes. It is then stirred continuously from the time of cutting until the whey is drained from the curd. After cutting, the curd is heated in the whey gradually over a period of about 30 minutes to a temperature of about 100°F. The whey is drained after the curd has been heated.

The curd is then packed about 7 or 8 inches deep on each side of the cheese vat. When the curd is firm enough to be turned without breaking, it is cheddared. That is, it is cut into slabs 5 or 6 inches wide and turned frequently, and when firm enough, the slabs are piled into layers. After cheddaring, the curd is run through a curd mill and is spread over the bottom of the cheese vat and is stirred. Salt is mixed with the curd and the curd is piled on both sides of the cheese vat while additional whey drains.

After salting and draining, the curd is transferred to cloth lined metal hoops and is pressed for about 30 minutes to form a cheese. The surface of the cheese is dressed with a cloth and the cheese is pressed again for 12 to 24 hours. The cheese is then removed from the hoops, wrapped in a suitable material and cured for a desired period.

Curing usually requires at least 60 days to provide what is known as green or low flavor curd. Lengthier curing periods of from 3 to 6 months, provide mildly flavored Cheddar cheese. Aged Cheddar cheese is produced by curing the cheese for periods in excess of 6 months and in some instances for a year or longer.

It has long been a goal in the cheese industry to reduce the curing time required to develop flavor in ripened cheeses. In this connection, curing has been effected at elevated temperatures to increase the action of bacteria during the curing period and to more quickly develop the ripened flavor. However, the presence of undesirable microorganisms can be accentuated with currently known rapid curing techniques and bad cheese can be produced. Accordingly, for this and other reasons, it has been proposed to produce ripened cheese from pasteurized or sterile milk. It is well known that heat treatment of milk to pasteurize the milk or sterilize the milk destroys desirable microorganisms and enzymes, as well as undesirable microorganisms and enzymes. Various methods are known, such as described in U.S. Pat. No. 3,650,768 to Roberts, which issued Mar. 21, 1972, to provide desirable ripening agents in heat treated and pasteurized milk so as to produce improved flavor in cheese made from such heat-treated milks. However, even when a desirable flavor is produced by the addition of microorganisms and enzymes, such as is taught in the Roberts' patent, the period of time required to cure the cheese is still lengthy and it would be desirable to reduce the period of time for curing the cheese to provide a ripened cheese flavor. The present invention is directed to a method for reducing the period of time required to cure cheese, whether the cheese is made from raw, heat-treated, pasturized or sterilized milk.

It is an object of the present invention to provide an improved method for making ripened cheese. It is another object of the present invention to provide a method for making such cheese wherein the flavor of the cheese is developed more rapidly during curing. It is a further object of the present invention to provide a method for making American cheese and similar type cheese with accelerated aging or curing.

These and other objects of the present invention will become more clear from the following detailed disclosure.

It has been found, in accordance with various features of the present invention, that ripened cheese develops flavor more rapidly during the curing period when an effective amount of adenosine 3',5', cyclic monophosphate is added to the cheese curd. For convenience, adenosine 3',5', cyclic monophosphate is referred to herein as c-AMP. The c-AMP is added to the curd after separating the curd from the whey and prior to packing the curd into hoops and pressing the curd. There is no additional drainage of whey after addition of c-AMP. The c-AMP is distributed uniformly throughout the curd. In this respect, it is preferred to spray a solution of c-AMP onto the curd after the whey has been drained from the curd. The solution of c-AMP may have from about 5 to about 50 percent by weight of c-AMP. The c-AMP is applied at low levels in respect to the curd and in this connection is applied to the curd at a level of from about 0.2 milligrams to about 200 milligrams of c-AMP per pound of curd.

While not wishing to be bound by any theory, it is believed that the c-AMP acts as an enzyme catalyst for the ripening organisms of the cheese. When c-AMP is present at a level within the indicated range, the development of flavor to a particular level proceeds at a rate which is 2 to 5 times faster than the time normally required to develop that level of flavor. The use of c-AMP provides a method for the cheesemaker to shorten the period of time for curing the cheese and still use conventional curing organisms. Moreover, the c-AMP can also be used with microorganisms intended for use with pasteurized milk, such as is taught in the Roberts' patent set forth hereinabove.

c-AMP is commercially available in purified form. It should be understood, however, that the use of microorganisms capable of producing c–AMP and the use of yeasts, molds and crude extracts which are rich in c–AMP is also considered within the scope of the present invention.

The following examples further illustrate various features of the present invention but are intended to in no way limit the scope of the invention which is defined in the appended claims.

EXAMPLE 1

450 pounds of raw milk is heat-treated at a temperature of 160°F for no hold time to effect sub-pasteurization heat treatment thereof. The milk is pumped to a vat and allowed to cool at 88°F. To the cooled, heat-treated milk is added 1 pound of a *Streptococcus lactis* starter culture per 100 pounds of milk.

The milk is agitated and allowed to ripen for a period of 1 hour. Thereafter, rennet solution is mixed with the ripened milk and the stirring is stopped. After about 30 minutes, the curd is sufficiently firm to cut and the curd is cut with curd knives into cubes. The curd is then heated in the whey to a temperature of 103°F and is held at that temperature for 30 minutes. Stirring is then commenced and continued until the whey is drained. After the whey is drained, the curd is packed in a layer about 7 or 8 inches deep on each side of the vat. When the curd is firm enough to be turned without breaking, it is cheddared. The curd is then run through a curd mill and is spread evenly over the bottom of a vat and is stirred. Three pounds of salt for each 1000 pounds of milk are then mixed with the curd. Sufficient of the solution is sprayed onto the curd to provide 2 milligrams of c–AMP for each pound of curd.

The curd is then transferred to cloth-lined metal hoops and is pressed to provide a cheese. The cheese is then dried and wrapped in a plastic film in accordance with conventional procedures.

After wrapping, the cheese is stored in a warehouse at a temperature of 45°F to effect curing. The cheese is examined at periods of 2 weeks, 1 month, 2 months, 6 months and 1 year.

Cheese made in accordance with the above procedure, with the exception that the c–AMP is not added to the curd, is also prepared. This cheese is also placed in a warehouse at a temperature of 45°F to effect curing. The cheese prepared in accordance with conventional procedure but without the c–AMP present is examined at the end of 2 weeks, 1 month, 2 months, 6 months and 1 year.

The cheese containing the c–AMP had developed a typical, pleasant, mild Cheddar flavor at the end of a period of 2 weeks. At the end of 1 month, the flavor is judged to be comparable to that of the cheese not containing c–AMP after curing for a period of 6 months. At the end of 6 months, the cheese containing the c–AMP had developed a full, aged, Cheddar flavor. The cheese not containing the c–AMP did not develop a comparable flavor until after a curing period of 1 year.

EXAMPLE 2

500 pounds of raw milk is heat-treated at a temperature of 165°F for a period of 16 seconds to effect pasteurization thereof. The milk is pumped to a vat and allowed to cool to 88°F. A *Streptococcus lactis* starter culture is added to the milk. A *proteolytic micrococcus* culture is also added to the milk. The starter is added at a level of 1 pound of starter culture per 100 pounds of milk. The *proteolytic micrococcus* culture is added to the milk at a level of 1 pound of culture per 100 pounds of milk. The milk is then ripened, set and cut as set forth hereinabove in Example 1. c–AMP is again added to one lot of curd at a level of 4 milligrams per pound of curd and is not added to another lot of curd. When cheese is prespared and cured from the sample containing c–AMP a typical pleasant, mild Cheddar flavor is developed in a period of about 2 weeks. In the curd which does not contain c–AMP, a comparable flavor did not occur until after a curing period of about 2 months.

The present invention provides a method for decreasing the curing time required to obtain a desired level of flavor in ripened cheeses. The decrease in curing time is substantial and greatly facilitates the use of cheese storage facilities.

What is claimed is:

1. A method for producing ripened cheese in a reduced period of time which comprises adding an effective amount of adenosine 3',5', cyclic monophosphate to cheese curd after whey has been drained from the curd and prior to forming the curd into cheese.

2. A method in accordance with claim 1 wherein said adenosine 3',5', cyclic monophosphate is added to said curd at a level of from about .2 to about 200 milligrams per pound of curd.

3. A method in accordance with claim 1 wherein said adenosine 3',5', cyclic monophosphate is added to said curd by spraying a solution of said adenosine 3',5', cyclic monophosphate onto the surface of said curd.

4. A method in accordance with claim 3 wherein said solution contains from about 5 to about 50 percent by weight of adenosine 3',5', cyclic monophosphate.

* * * * *